Nov. 3, 1964     R. C. TELECKY     3,155,168
CHISEL AND SWEEP PLOW

Filed Dec. 20, 1962     2 Sheets-Sheet 1

Richard C. Telecky
INVENTOR.

BY *Clarence A. O'Brien*
*and Harvey B. Jacobson*
Attorneys

Nov. 3, 1964 R. C. TELECKY 3,155,168
CHISEL AND SWEEP PLOW
Filed Dec. 20, 1962 2 Sheets-Sheet 2
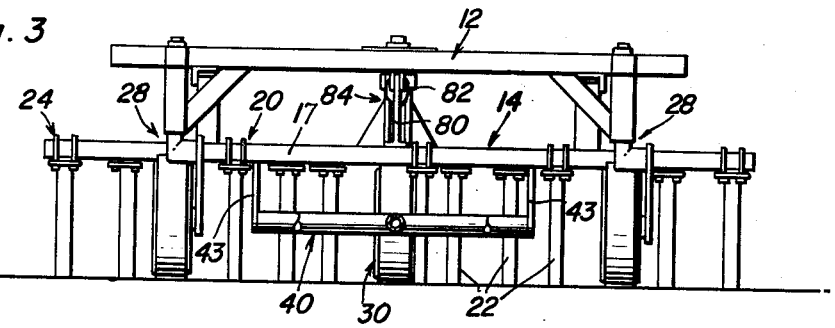
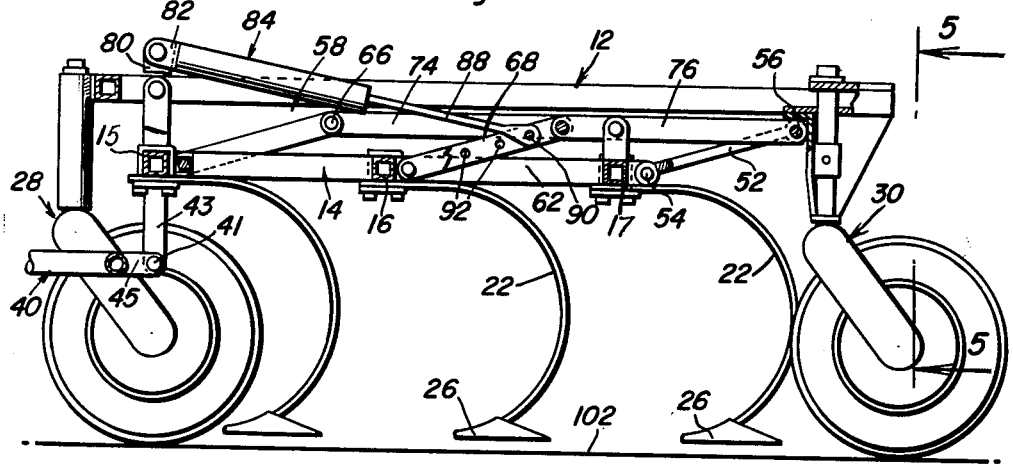
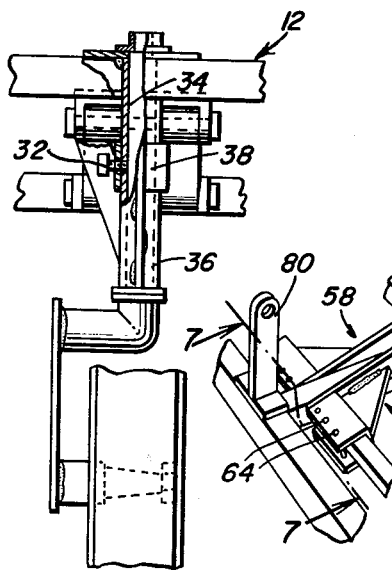
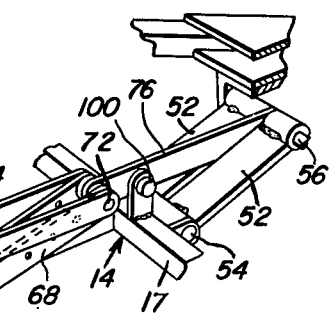
Richard C. Telecky
INVENTOR.
BY *Clarence A. O'Brien*
*and Harvey B. Jacobson*
Attorneys

United States Patent Office 3,155,168
Patented Nov. 3, 1964

3,155,168
CHISEL AND SWEEP PLOW
Richard C. Telecky, Sprague, Wash.
(Box 82, Ritzville, Wash.)
Filed Dec. 20, 1962, Ser. No. 246,057
7 Claims. (Cl. 172—484)

This invention relates to a novel and useful chisel and sweep plow constructed in a manner enabling the depending earth working implements of the plow to penetrate the ground to a pre-determined depth.

In addition to being provided with means for accurately controlling the depth of the earth working implements, the sweep plow of the instant invention is constructed in a manner whereby the plow will track behind a towing vehicle without slewing diagonally or sideways, relative to the direction of movement of the towing vehicle. The sweep plow of the instant invention includes a main frame which is generally triangular in plan shape and which is provided with ground engaging support wheels at each of the apices of the triangular frame. In this manner, the main frame of the plow defines a tripod type of support thereby reducing the amount of pitch of the main support frame of the plow when the plow is travelling over rough ground.

The sweep plow of the instant invention is provided with a lift frame which is supported from the main frame for vertical adjustment relative to the latter and the lift frame is provided with depending earth working implements. Additionally, the sweep plow of the instant invention is provided with a tongue or hitch assembly supported directly from the lift frame of the plow whereby the main support frame of the plow is utilized solely for the purpose of supporting the lift frame of the plow in proper elevated positions above the ground being worked. In this manner, the pulling force of the towing vehicle is transferred directly to the lift frame and thereby greatly reduces the tendency of the lift frame to cant or rotate about a generally horizontally disposed axis extending transversely of the plow as the plow is being pulled over the ground being worked. If the towing hitch were supported directly from the main frame of the plow there would be a tendency for the main frame, and thus the lift frame, to be slightly rotated about a generally horizontally disposed axis extending transversely of the plow if the elevation of the lift frame relative to the main frame were altered.

The main object of this invention is to provide a chisel and sweep plow which will be capable of supporting a plurality of earth working implements at a desired height relative to the ground being worked.

A further object of this invention, in accordance with the immediately preceding object, is to provide a chisel and sweep plow constructed in a manner whereby the tendency of the plow to slew sideways relative to the direction of movement of the towing vehicle will be substantially reduced.

Still another object of this invention is to provide a sweep plow constructed in a manner whereby a change in the depth of the working implements or the thrust applied to the plow to pull it over the ground being worked will be substantially ineffective to cant the plow about a generally horizontally disposed axis extending transversely thereof.

A final object to be specifically enumerated herein is to provide a chisel and sweep plow in accordance with the preceding objects which will conform to conventional forms of manufacture, be of simple construction and easy to use so as to provide a device that will be economically feasible, long lasting and relatively trouble free in operation.

These together with other objects and advantages which will become subsequent apparent reside in the details of construction and operation as more fully hereinafter described and claimed, reference being had to the accompanying drawings forming a part hereof, wherein like numerals refer to like parts throughout, and in which:

FIGURE 3 is a front elevational view of the embodiments illustrated in FIGURES 1 and 2;

FIGURE 4 is an enlarged fragmentary longitudinal vertical sectional view taken substantially upon the plane indicated by the section line 4—4 of FIGURE 1;

FIGURE 5 is an enlarged fragmentary vertical sectional view taken substantially upon the plane indicated by the section line 5—5 of FIGURE 4;

Figure 7:
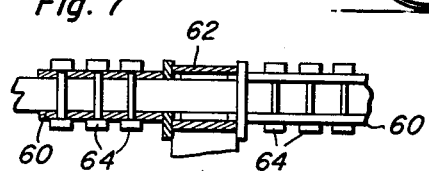
Figure 8:
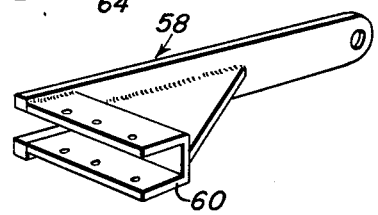

FGURE 6 is a fragmentary perspective view of the parallelogram linkage means by which the lift frame of the plow is supported for vertical adjustment relative to the main frame of the plow;

FIGURE 7 is an enlarged fragmentary transverse vertical sectional view taken substantially upon the plane indicated by the section line 7—7 of FIGURE 6; and FIGURE 8 is an enlarged perspective view of one of the parallelogram linkage members.

Referring now more specifically to the drawings, the numeral 10 generally designates the chisel and sweep plow of the instant invention which can be seen in FIGURES 1 through 4 as including a main frame generally referred to by the reference numeral 12 which is generally triangular in plan and a lift frame generally referred to by the reference numeral 14 which is generally rectangular in plan.

The lift frame 14 includes longitudinal members 15, 16, and 17 which extend longitudinally of the lift frame 14 and transversely of the plow 10 that are interconnected at corresponding ends by means of transverse members 18 extending longitudinally of the plow 10. The lift frame 14 is provided with a plurality of earth working assemblies generally referred to by the reference numeral 20 and each of the earth working assemblies comprises a curved and somewhat resilient support arm 22 which is secured to a corresponding one of the longitudinal members 16 by means of a clamp assembly generally referred to by the reference numeral 24. Each of the support arms 22 is curved forwardly and downwardly at its lower end and is provided with a shovel 26 at its lower end.

The main frame 12 includes a pair of dirigible front wheel assemblies generally referred to by the reference numeral 28 which are pivotally supported from the main frame 12 for rotation about vertical axes adjacent the forwardmost apices of the main frame 12. In addition, the rear apex of the main frame 12 includes a vertically adjustable wheel assembly generally referred to by the reference numeral 30 which may be secured in adjusted elevated positions by means of a set screw 32. From FIGURE 5 of the drawings, it may be seen that the assembly 30 includes a shank portion 34 which is rotatably received in an upstanding sleeve 36 supported from the main frame 12. The sleeve 36 has a collar 38 secured thereto and the set screw 32 is threadedly engaged with the collar 38 and the sleeve 36 and may be engaged with the shank 34 for retaining the assembly 30 in adjusted elevated positions relative to the main frame 12.

Figure 1:
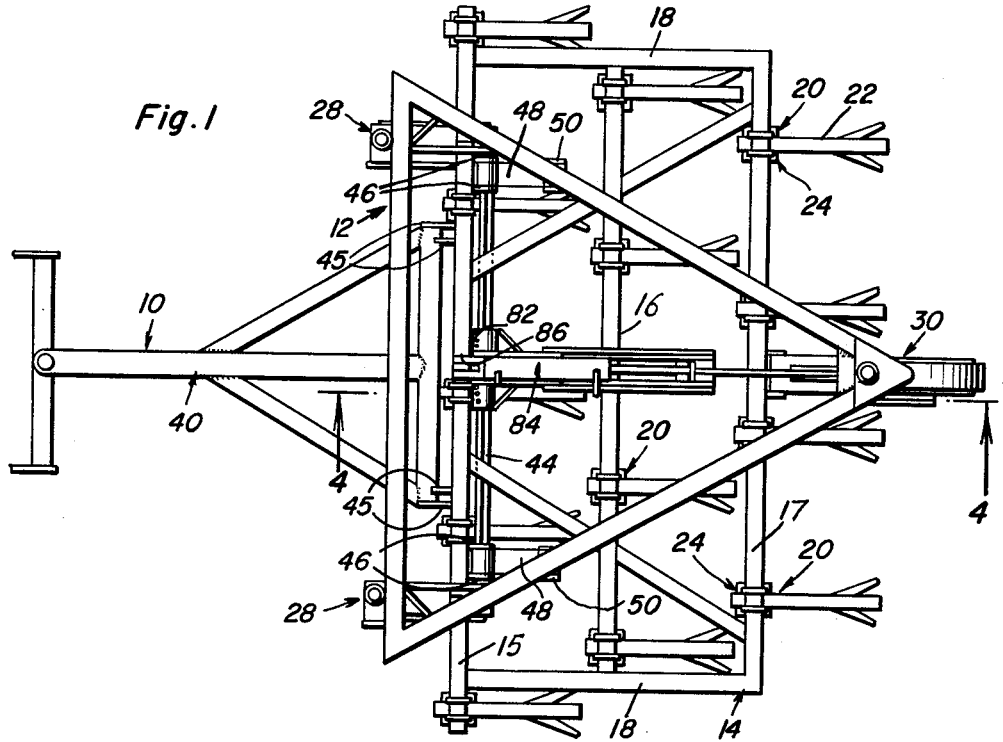
FIGURE 1 is a top plan view of the chisel and sweep plow of the instant invention.
Figure 2:
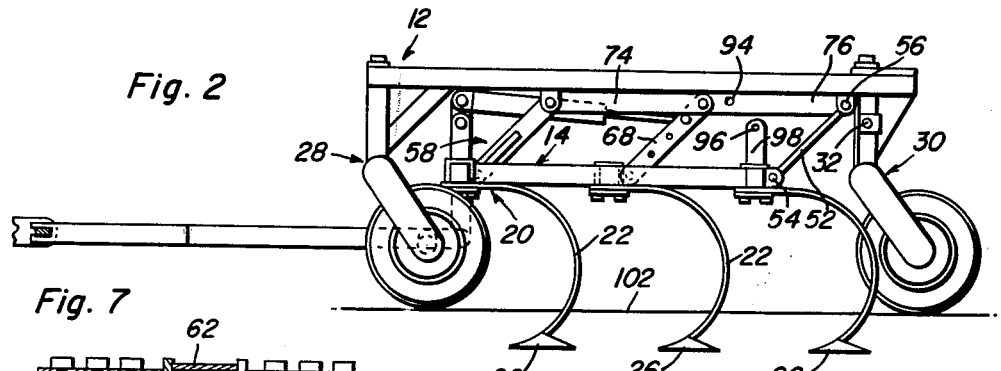
FIGURE 2 is a side elevational view of the embodiment illustrated in FIGURE 1.

From FIGURES 1 and 2 of the drawings, it may be seen that a tongue assembly generally referred to by the reference numeral 40 is provided and pivotally secured to the lift frame 14 by means of pivot pins 41 secured through the apertured lower ends of a pair of hangers 43 dependingly supported from the longitudinal member 15 and two pair of rearwardly projecting apertured ears 45 carried by the tongue assembly 40, see FIGURES 1 and 4.

A square lay shaft 44 is rotatably supported from the forwardmost longitudinal member 15 of the lift frame 14 by means of journal blocks 46 that are secured to the opposite end portions of the forward most longitudinal member 15. A pair of crankarms 48 are secured to the opposite ends of the lay shaft 44 between adjacent ones of the journal blocks 46 and the free ends of the crankarms 48 are pivotally secured to the main frame 12 by means of journal blocks 50. In addition, from FIGURE 6 of the drawings it may be seen that a pair of links similar to the crankarms or links 48 and designated by the reference numeral 52 are pivotally secured to the lift frame 14 at one pair of corresponding ends by means of a pivot shaft 54 and to the main frame 12 at the other pair of corresponding ends by means of a pivot shaft 56.

A pair of crankarms generally designated by the reference numerals 58 are provided with transversely extending U-shaped clamps 60 on one pair of corresponding ends which are secured to the midportion of the lay shaft 44 on opposite sides of the center transverse member 62 of the lift frame 14 by means of suitable fasteners 64. The other pair of ends of the crankarms 58 are interconnected by means of a pivot shaft 66.

A pair of power links 68 have one pair of ends pivoted to opposite sides of the center transverse member 62 by means of a pivot shaft 70 and the other pair of ends of the power links 68 are interconnected by means of the pivot shaft 72. From FIGURE 6 of the drawings, it may be seen that connecting links 74 are utilized to interconnect the pivot pins or shafts 66 and 72 and that a connecting link 76 is utilized to interconnect the pivot shafts 56 and 72.

Attached to the forwardmost longitudinal member 15 of the lift frame 14 is an upstanding apertured mount 80 to which a bifurcated end 82 of a fluid motor cylinder generally referred to by the reference numeral 84 is pivotally secured by means of a pivot pin 86. The free end of the piston rod 88 of the fluid motor 84 is pivotally secured between the power links 68 by means of a pivot pin 90 secured through one set of the apertures 92 formed in the power links 68. From FIGURE 2 of the drawings it may be seen that the link 76 is apertured as at 94 and that the aperture 94 is registrable with the aperture 96 formed in an upstanding brace 98 which is welded to the rearmost longitudinal member 16 of the lift frame 14. As it can be seen from FIGURE 6 of the drawings a fastener 100 may be passed through the aligned apertures 94 and 96 to retain the lift frame 14 in an elevated position with the shovels 26 above the surface of the ground 102 as shown in FIGURE 4 of the drawings.

In operation, the three wheel assemblies 28 and 30 provide a tripod like support for the main frame 12. The fluid motor 84 may be adjusted so as to provide the desired height of the lift frame 14 and depth of the shovels 26 in the ground 102. Inasmuch as the towing hitch or tongue 40 is secured directly to the lift frame 14, there will be little tendency of the front end of the lift frame 14 to tip downwardly and thus raise the rear support arms 22 and the shovels 26 secured thereto. Inasmuch as the lift frame 14 is supported solely from the wheeled main frame 12, the normal tendency of the support arms 22 and the shovels 26 to pull the lift frame 14 downwardly will of course bring the wheel assemblies 28 and 30 into heavy rolling contacting relation with the ground 102. In this manner, the supporting wheel assemblies 28 and 30 will be fully capable of preventing the plow 10 from slewing sideways relative to the direction of movement of the towing vehicle (not shown).

Inasmuch as the power links 68 are provided with a plurality of sets of apertures 92, extensible motors of varying lengths may be utilized to raise and lower the lift frame 14 relative to the main frame 12. In addition, if it is desired, the clamp assemblies 24 of the earth working assemblies 20 may be constructed in a manner whereby the upper ends of the support arms 22 may be pivotally supported from the lift frame 14 for movement between the positions illustrated in FIGURES 2 and 4 of the drawings and positions with the lower ends of the support arms 22 pivoted rearwardly and upwardly in the event the shovels 26 or support arms 22 strike an immovable object. In this instance, the support arms 22 would of course be provided with suitable means yieldingly urging the support arms 22 to the lowermost positions illustrated in FIGURES 2 and 4 of the drawings.

With attention now directed to FIGURE 2 of the drawings, it may be seen that as the lift frame 14 is lowered it is shifted rearwardly relative to the main frame 12. Therefore, as the depth of the support arms 22 in the ground 102 is increased, the amount of overhanging of the main frame 12 over the front of the plow 10 is increased and the front wheel assemblies 28 are spaced even further out in front of the axis of rotation of the tongue assembly 40. In this manner, the normal tendency of the rear of the lift frame 14 to tilt upwardly because of the increased drag on the support arms 22 is offset to a great extent since the front wheel assemblies 28 are spaced at greater distances forwardly of the axis of rotation of the lift frame 14 relative to the tongue assembly 40. In addition, as the lift frame 14 is lowered, the axis of rotation of the lift frame relative to the tongue assembly 40 is lowered relative to the main frame 12. Therefore, the effective length of the lever arm defined by the wheel assemblies 28 and the main frame 12 and resisting upward swinging movement of the rear of the lift frame 14 about the axis of rotation of the lift frame relative to the tongue assembly 40 is increased in order to still further resist the tilting of the lift frame 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A sweep plow comprising a main support frame including front and rear supporting wheels at the front and rear ends of said support frame respectively, a generally horizontally disposed lift frame, parallelogram linkage means mounting said lift frame on said main frame for guided vertical adjustment relative to said main frame while maintaining the generally horizontal attitude of said lift frame, a plurality of depending earth working members supported from said lift frame for vertical adjustment relative to said main support frame simultaneously with said lift frame, and an elongated tow hitch secured at its rear end to the front end of said lift frame for movement about a horizontal transverse axis disposed below the medial plane of said lift frame and above the lower ends of said earth working members and adapted to have its front end removably secured to a draft vehicle, motor means interconnected between said lift frame and said linkage means for vertically adjusting said lift frame relative to said main frame.

2. The combination of claim 1 wherein said main frame includes steerable and fixed front and rear wheel assemblies respectively.

3. The combination of claim 2 wherein said rear wheel assembly includes means for vertically adjusting the rear wheel assembly relative to said main frame.

4. A sweep plow comprising a main support frame including front and rear supporting wheels at the front and rear ends of said support frame respectively, a generally horizontally disposed lift frame, parallelogram linkage means mounting said lift frame on said main frame for guided vertical adjustment relative to said main frame while maintaining the generally horizontal attitude of said lift frame, a plurality of depending earth working members supported from said lift frame for vertical adjustment relative to said main support frame simultaneously with said lift frame, and an elongated tow hitch secured at its rear end to the front end of said lift frame for movement about a horizontal transverse axis disposed below the medical plane of said lift frame and above the lower ends of said earth working members and adapted to have its front end removably secured to a draft vehicle, said parallelogram linkage means, comprising a plurality of generally parallel and equal length links pivoted at one set of corresponding ends to said main frame and at the other set of forwardly and downwardly inclined ends to said lift frame about axes extending transversely of said main and lift frames.

5. A sweep plow comprising a main support frame including front and rear supporting wheels at the front and rear ends of said support frame respectively, a generally horizontally disposed lift frame, parallelogram linkage means mounting said lift frame on said main frame for guided vertical adjustment relative to said main frame while maintaining the generally horizontal attitude of said lift frame, a plurality of depending earth working members supported from said lift frame for vertical adjustment relative to said main support frame simultaneously with said lift frame, and an elongated tow hitch secured at its rear end to the front end of said lift frame for movement about a horizontal transverse axis disposed below the medial plane of said lift frame and above the lower ends of said earth working members and adapted to have its front end removably secured to a draft vehicle, said main frame being generally triangular in plan and its apex is disposed rearmost with one steerable wheel assembly being provided at each end of the forward base side of said main frame and a single fixed wheel assembly provided at the rear apex of said main frame.

6. A sweep plow comprising a main support frame including front and rear supporting wheels at the front and rear ends of said support frame respectively, a generally horizontally disposed lift frame, parallelogram linkage means mounting said lift frame on said main frame for guided vertical adjustment relative to said main frame while maintaining the generally horizontal attitude of said lift frame, a plurality of depending earth working members supported from said lift frame for vertical adjustment relative to said main support frame simultaneously with said lift frame, and an elongated tow hitch secured at its rear end to the front end of said lift frame for movement about a horizontal transverse axis disposed below the medial plane of said lift frame and above the lower ends of said earth working members and adapted to have its front end removably secured to a draft vehicle, said linkage means including means for shifting the axis of rotation of said tow hitch relative to said lift frame rearwardly of the axes of rotation of the front supporting wheels as said lift frame is lowered relative to said main support frame.

7. The combination of claim 6 wherein said linkage means also includes means for shifting the axis of rotation of said tow hitch to a point disposed lower than the axes of rotation of said front supporting wheels as said lift frame is lowered relative to said main support frame.

References Cited in the file of this patent
UNITED STATES PATENTS

| | | |
|---|---|---|
| 250,512 | Evans et al. | Dec. 6, 1881 |
| 2,969,119 | Barry | Jan. 24, 1961 |